J. MICHALCZAK.
ANIMAL TRAP.
APPLICATION FILED AUG. 11, 1920.
1,390,805.
Patented Sept. 13, 1921.
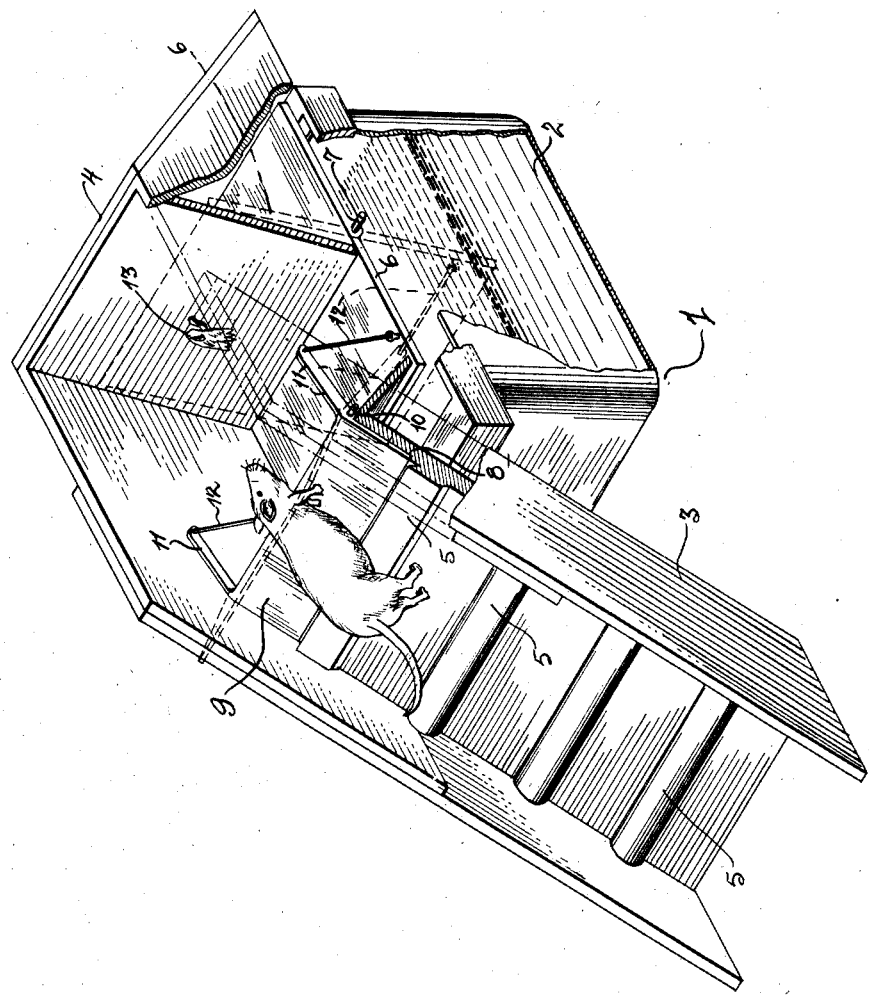
INVENTOR
Joseph Michalczak
BY
ATTORNEY

UNITED STATES PATENT OFFICE.

JOSEPH MICHALCZAK, OF HIGHLAND BEACH, NEW JERSEY.

ANIMAL-TRAP.

1,390,805.    Specification of Letters Patent.    Patented Sept. 13, 1921.

Application filed August 11, 1920. Serial No. 402,783.

*To all whom it may concern:*

Be it known that I, JOSEPH MICHALCZAK, a citizen of Poland, residing at Highland Beach, in the county of Monmouth and State of New Jersey, have invented certain new and useful Improvements in Animal-Traps, of which the following is a specification.

This invention relates to animal traps, particularly to traps for capturing rodents and other domestic pests.

The main object of the invention is to provide a trap which will capture the animal and prevent its subsequent escape by killing it. The invention consists in the novel manner of accomplishing the above, as will become apparent in the description below, in which like characters of reference refer to like-named parts in the drawings.

Referring briefly to the drawings, the figure is a fragmentary perspective view, parts being broken away, showing the complete trap and illustrating the manner of its operation.

Referring now in detail to the drawings, the numeral 1 represents a box-like frame such as a tank containing a volume of water 2. The tank 1 is surmounted by an enlarged upper frame 4 to which leads a ladder 3 having steps 5.

A trap door 6 is mounted on pivots 7, normally covering the top of the tank, and adapted to tilt when a weight is applied, as by an animal in attempting to reach the bait 13, from the top step of the ladder 3.

The center of gravity of the door on plate 6 is in front of the pivots and its front edge is supported by cords 12 attached to rigid arms 11 extending from its top step as shown, the bait being fixed upon a hook set in the frame 4.

In use, the animal, being attracted by the bait, ascends the ladder 3 and attempts to take the bait. In so doing its weight passes over the trap door 6, whence the latter is depressed and at the same time the plate 9 lifts the animal from behind, thus making it impossible to turn back. The plate 9 also aids in suddenly plunging the animal through the door, and immediately thereafter the door rises to prevent the animal's escape. Having fallen into the water 2, the animal drowns.

I claim:

1. An animal trap comprising a tank, a frame mounted upon said tank, a trap door communicating between said frame and said tank, a ladder rising to said tank, a recess having a shoulder above the topmost step of said ladder, a plate normally resting in the mentioned recess, said plate being pivotally attached to the top of said ladder, arms extending from said panel adjacent said pivotal attachment, and cords connecting said arms with said trap door.

2. An animal trap comprising a tank, a frame over said tank, a plate pivoted in said frame adapted to tilt in one direction, a ladder leading to the top of said frame, a second plate pivoted to the top of said ladder adapted to tilt upward therefrom, arms rigid with said second plate extending over the adjacent portion of the first named plate and flexible connections between said arms and the depressible portion of said first plate.

In testimony whereof I affix my signature.

JOSEPH MICHALCZAK.